United States Patent
Oyarzun et al.

(10) Patent No.: US 10,125,585 B2
(45) Date of Patent: Nov. 13, 2018

(54) REFRIGERATION SYSTEM WITH INTERNAL OIL CIRCULATION

(71) Applicant: GE Oil & Gas ESP, Inc., Oklahoma City, OK (US)

(72) Inventors: Raul Alejandro Oyarzun, Comodoro Rivadavia (AR); Ricardo Hector Teves, Comodoro Rivadavia (AR); Martin Russo, Comodoro Rivadavia (AR); Juan Cruz Pires, Comodoro Rivadavia (AR)

(73) Assignee: GE Oil & Gas ESP, Inc., Oklahoma City, OK (US)

( * ) Notice: Subject to any disclaimer, the term of this patent is extended or adjusted under 35 U.S.C. 154(b) by 0 days.

(21) Appl. No.: 15/068,537

(22) Filed: Mar. 12, 2016

(65) Prior Publication Data

US 2017/0264170 A1    Sep. 14, 2017

(51) Int. Cl.
  *E21B 43/12*     (2006.01)
  *H02K 9/193*     (2006.01)
  *H02K 5/20*      (2006.01)

(52) U.S. Cl.
  CPC ............ *E21B 43/128* (2013.01); *H02K 5/20* (2013.01); *H02K 9/193* (2013.01)

(58) Field of Classification Search
  CPC ......... E21B 43/128; H02K 9/193; H02K 5/20
  See application file for complete search history.

(56) References Cited

U.S. PATENT DOCUMENTS

| | | | |
|---|---|---|---|
| 3,672,795 A | 6/1972 | Arutunoff | |
| 4,487,257 A | 12/1984 | Dauphine | |
| 4,582,131 A | 4/1986 | Plummer et al. | |
| 4,643,258 A | 2/1987 | Kime | |
| 4,685,867 A * | 8/1987 | Patun | E21B 36/001 310/54 |
| 5,845,709 A | 12/1998 | Mack et al. | |
| 6,056,511 A | 5/2000 | Kennedy et al. | |
| 6,126,416 A | 10/2000 | Lee | |
| 6,666,269 B1 | 12/2003 | Bangash et al. | |
| 6,691,782 B2 | 2/2004 | Vandevier | |
| 6,964,299 B2 | 11/2005 | Scarsdale | |
| 8,696,327 B2 | 4/2014 | Forsberg | |
| 8,807,970 B2 | 8/2014 | Schlenhoff et al. | |
| 8,845,308 B2 | 9/2014 | Tetzlaff et al. | |
| 2004/0251019 A1 | 12/2004 | Howell | |

(Continued)

FOREIGN PATENT DOCUMENTS

WO      2015178887      11/2015

OTHER PUBLICATIONS

Flowserve Corporation; Byron Jackson Electrical Submersible Pumps and Oil-Filled Motors; FlowServe, Bulletin FPD-1361b (E/A4) Nov. 2012.

(Continued)

*Primary Examiner* — Brad Harcourt

(74) *Attorney, Agent, or Firm* — Crowe & Dunlevy, P.C.

(57) ABSTRACT

A pumping system configured to be deployed in a wellbore includes a motor that is filled with a motor lubricant oil, a production pump driven by the motor, a heat exchanger and an internal oil circulation system contained within the pumping system. The internal oil circulation system circulates the motor lubricant oil between the motor and the heat exchanger.

18 Claims, 4 Drawing Sheets

(56) References Cited

U.S. PATENT DOCUMENTS

| | | |
|---|---|---|
| 2006/0081377 A1 | 4/2006 | Bullock et al. |
| 2006/0245957 A1 | 11/2006 | Berry et al. |
| 2008/0284268 A1 | 11/2008 | Tetzlaff |
| 2009/0232664 A1 | 9/2009 | Qu |
| 2010/0143160 A1 | 6/2010 | Forsberg |
| 2010/0206554 A1* | 8/2010 | Neuhaus .................. E21B 4/04 166/244.1 |
| 2010/0329908 A1 | 12/2010 | Martinez |
| 2011/0079391 A1 | 4/2011 | Bedouet |
| 2011/0211979 A1 | 9/2011 | Schlenhoff et al. |
| 2012/0189466 A1 | 7/2012 | Snyder et al. |
| 2013/0091878 A1 | 4/2013 | Jankowski et al. |
| 2015/0064032 A1 | 3/2015 | Sadana et al. |

OTHER PUBLICATIONS

Flowserve Corporation; Pleuger Electrical Submersible Pumps and Water-Filled Motors; Flowserve, Bulletin FPD-1362c (E/A4) Jun. 2015.

Flowserve Corporation; SUBM Electrical Submersible Pumps and Motors; Flowserve, Bulletin PS-50-3k (E/A4) May 2014.

Flowserve Corporation; Flowserve Submersible Pumps and Motors; Flowserve, FPD-1144 (E); Jun. 2008.

* cited by examiner

REFRIGERATION SYSTEM WITH INTERNAL OIL CIRCULATION

FIELD OF THE INVENTION

This invention relates generally to the field of submersible pumping systems, and more particularly, but not by way of limitation, to a submersible pumping system that includes a motor cooling system.

BACKGROUND

Submersible pumping systems are often deployed into wells to recover petroleum fluids from subterranean reservoirs. Typical submersible pumping systems include a number of components, including one or more fluid filled electric motors coupled to one or more high performance pumps located above the motor. When energized, the motor provides torque to the pump, which pushes wellbore fluids to the surface through production tubing. Each of the components in a submersible pumping system must be engineered to withstand the inhospitable downhole environment.

Most wells include a casing that extends along the inside of the wellbore to maintain the structural integrity of the wellbore and to isolate the introduction of fluids into the well. "Perforations" are formed through the casing at desired locations to permit the ingress of fluids from a producing formation into the casing. In many cases, the submersible pumping system is positioned above the perforations in the wellbore. By positioning the submersible pumping system above the perforations, a cooling effect is achieved as fluid drawn into the pump passes by the motor. In installations where insufficient fluid is available to provide this cooling effect, the electric motor may overheat and fail.

There are however, recognized benefits to installing at least a portion of the submersible pumping system below the perforations in what is occasionally referred to as a "sumped" position. By placing at least the intake of the pump below the perforations, the operator is able to maximize wellbore drawdown, which can increase the production of fluids from the well. In certain wells, the placement of the intake below the perforations also decreases the gas content present in the influent to the pump. As two-phase fluids enter the well through the perforations, lighter gaseous components tend to rise as the heavier liquid components fall. Placing the intake of the pump below the perforations enhances gravity separation and decreases the gas content in the pump influent. Reducing the gas content in the influent decreases the risks of gas locking and generally improves the efficiency of the submersible pumping system.

The primary problem associated with placing the submersible pumping system below the perforations is the lack of cooling provided by the movement of fluid over the electric motor. When the submersible pumping system is placed below the perforations, fluid entering the well through the perforations may be drawn into the pump intake without passing over the motor. In this way, the fluid around the motor may become relatively stagnant and unable to provide sufficient heat dissipation.

Manufacturers have used several methods to overcome this problem. The most common method for increasing flow around the electric motor is through the use of a shrouded intake. An intake shroud typically includes a closed end above the pump intake and an open end adjacent the bottom of the motor. As fluids are drawn into the wellbore through perforations, the fluids are conducted around the exterior of the motor by the shroud. While generally effective at providing a fluid flow around the motor, the shroud requires additional space between the submersible pumping system and the well casing and may present an undesirable pressure drop under certain conditions. Furthermore, the cooling effect provided by the shroud is dependent upon the availability of adequate liquid production into the wellbore. In marginal wells or wells with a high gas-fraction, the lack of sufficient quantities of liquid will reduce the cooling effect provided by a shrouded solution. There is, therefore, a need for an improved motor cooling system that overcomes the deficiencies of the prior art.

SUMMARY OF THE INVENTION

In exemplary embodiments, a pumping system configured to be deployed in a wellbore includes a motor that is filled with a motor lubricant oil, a production pump driven by the motor, a heat exchanger and an internal oil circulation system contained within the pumping system. The internal oil circulation system circulates the motor lubricant oil between the motor and the heat exchanger.

In another aspect, a pumping system configured for deployment within a wellbore includes an electric motor that is filled with motor lubricant oil, a heat exchanger and an internal oil circulation system connected between the electric motor and the heat exchanger. The internal oil circulation system is configured to circulate motor oil between the motor and the heat exchanger. The internal oil circulation system is not directly exposed to the wellbore.

In yet another aspect, the present invention includes a method for controlling the operational temperature of an electric motor in a submersible pumping system disposed in a wellbore, where the pumping system includes a production pump driven by the electric motor to produce fluids from the wellbore. The method includes the steps of providing an oil circulation pump driven by the electric motor and providing a heat exchanger. The method continues with the step of activating the oil circulation pump to draw motor lubricant at an elevated temperature through the electric motor, where the motor lubricant at an elevated temperature has absorbed heat from the operating electric motor. Next, the method continues with the step of moving the hot motor lubricant from the electric motor to the heat exchanger through an internal oil circulation system. As the motor lubricant passes through the heat exchanger, the heat exchanger reduces the temperature of the motor lubricant to a second temperature. The method continues by moving the cooled motor lubricant from the heat exchanger back to the operating motor through the internal oil circulation system. The method concludes with the step of expelling the cooled motor lubricant from the internal oil circulation system to the motor.

DETAILED DESCRIPTION

Figure 1:
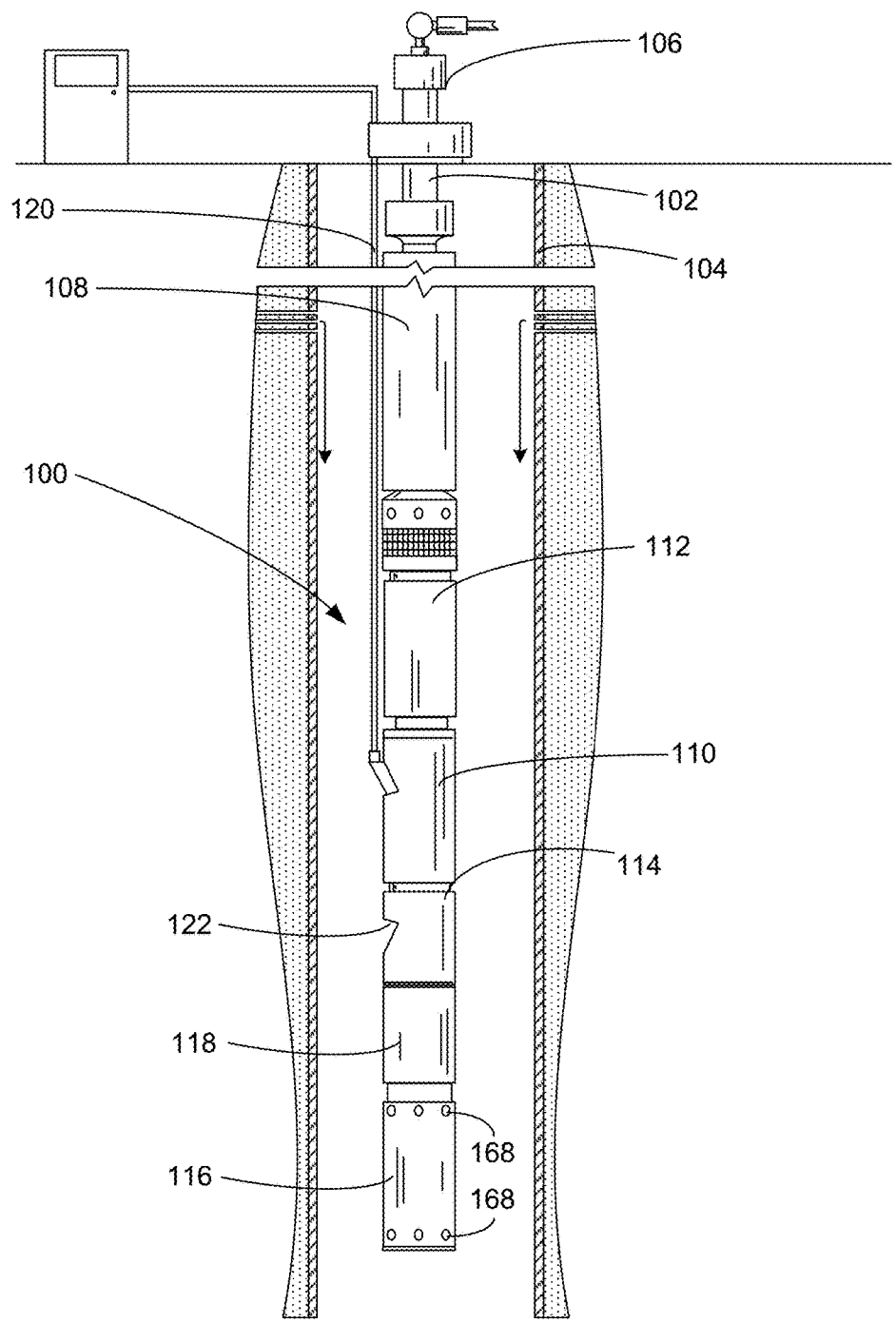
FIG. 1 is an elevational view of the submersible pumping system constructed in accordance with an embodiment of the present invention.

In accordance with an embodiment of the present invention, FIG. 1 shows an elevational view of a pumping system 100 attached to production tubing 102. The pumping system 100 and production tubing 102 are disposed in a wellbore 104, which is drilled for the production of a fluid such as water or petroleum. As used herein, the term "petroleum" refers broadly to all mineral hydrocarbons, such as crude oil, gas and combinations of oil and gas. The production tubing 102 connects the pumping system 100 to a wellhead 106 located on the surface.

The pumping system 100 includes a production pump 108, a motor 110, a seal section 112, a coupler 114, a heat exchanger 116 and an oil circulation pump 118. In an embodiment, the motor assembly 110 is an electrical motor that receives its power from a surface-based supply through a power cable 120. The motor assembly 110 converts the electrical energy into mechanical energy, which is transmitted to the production pump 108 by one or more shafts (not shown in FIG. 1). The production pump 108 then transfers a portion of this mechanical energy to fluids within the wellbore 104, causing the wellbore fluids to move through the production tubing 102 to the surface.

The production pump 108 is a turbomachine that uses one or more impellers and diffusers to convert mechanical energy into pressure head. In an alternative embodiment, the production pump 108 is a progressive cavity (PC) or positive displacement pump that moves wellbore fluids with one or more screws or pistons. Although demonstrated in a vertical wellbore 104, it will be appreciated that pumping system 100 may also be implemented in horizontal and non-vertical wellbores. Aspects of the pumping system 100 may also find utility in surface pumping applications and in the production of energy from geothermal resources.

The seal section 112 shields the motor 110 from axial thrust loading produced by the production pump 108 and prevent the ingress of wellbore fluids into the motor 110. The seal section 112 may also accommodate expansion and contraction of lubricants within the motor 110.

The coupler 114 provides a connection between the motor 110 and the oil circulation pump 118. In some embodiments, the coupler 114 includes a socket 122 that is connected to the electrical connections within the motor 110. The socket 122 can be used for connecting sensors or additional powered components within the pumping system 100.

Generally, the heat exchanger 116 and oil circulation pump 118 are configured to cooperatively remove heat from the motor 110. Motor lubricants from the motor 110 are pumped by the oil circulation pump 118 through the heat exchanger 116. The motor lubricants absorb heat from the motor 110 and expel heat in the heat exchanger 116. As explained below, the motor lubricants are carried between the motor 110 and heat exchanger 116 through conduits internal to the pumping system 100.

The use of the heat exchanger 116 and oil circulation pump 118 presents a significant advance in the maintenance of motor temperatures, particularly when the motor 110 is positioned near the bottom of the wellbore 104. Because the motor cooling system is not dependent on external convective cooling, the motor 110 can be operated in environments with reduced fluid flow around the motor 110. In particular, the novel motor cooling systems will find particular utility in situations where the motor 110 is placed below the perforations in the wellbore 104 (as illustrated in FIG. 1) or in marginal wells that do not produce sufficient fluid volume for external convective cooling.

Although only one production pump 108, motor 110, seal section 112, coupler 114, heat exchanger 116 and oil circulation pump 118 are shown in FIG. 1, it will be understood that more than one of each of these components can be utilized within the pumping system 100 when appropriate.

Figure 2:
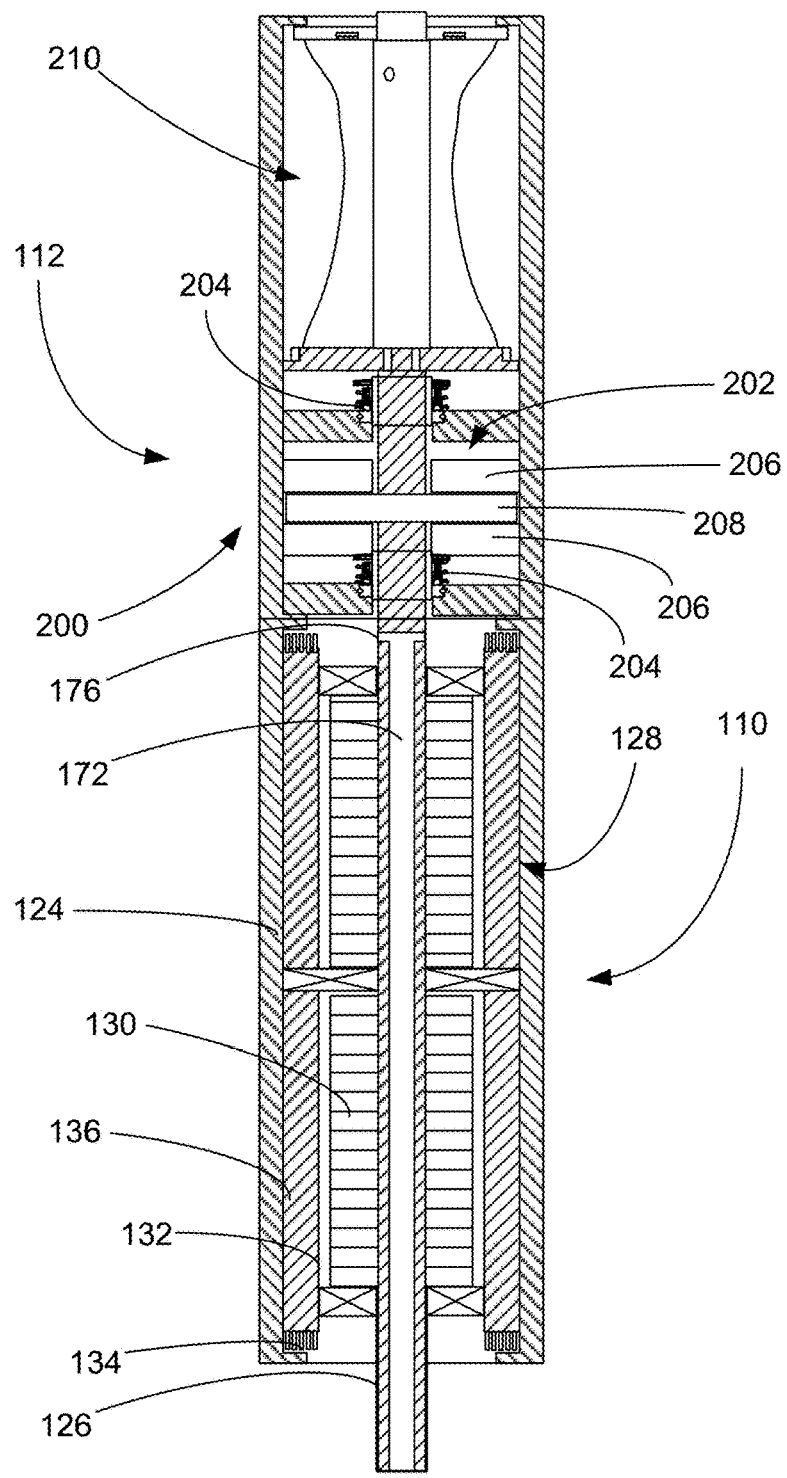
FIG. 2 is a cross-sectional depiction of the motor of the pumping system of FIG. 1.

Referring now to FIG. 2, shown therein is a side cross-sectional view of the motor 110 and seal section 112. The motor 110 includes a motor housing 124, a shaft 126, a stator assembly 128, and a rotor 130. The motor housing 124 encompasses and protects the internal portions of the motor 110. The bottom of the motor 110 is connected to, and in fluid communication with, the coupler 114 and oil circulation pump 118.

The seal section 112 is attached to the upper end of the motor 110 and provides a system for accommodating the thrust load of the production pump 108. The seal section 112 includes a thrust chamber 200 that houses a thrust bearing assembly 202 and one or more mechanical seals 204. The thrust bearing assembly 202 includes a pair of stationary bearings 206 and a thrust runner 208 attached to the shaft 134. The thrust runner 208 is captured between the stationary bearings 206, which limit the axial displacement of the thrust runner 208 and the shaft 134. The seal section 112 also includes a fluid isolation assembly 210. The fluid isolation assembly 210 may include a one or more separation mechanisms, such as bag seals, labyrinth seals and piston seals. The fluid isolation assembly 210 is used to isolate wellbore fluids in the production pump 108 from the clean lubricants in the seal section 112 and motor 110.

Adjacent the interior surface of the motor housing 124 is the stationary stator assembly 128 that remains fixed relative the motor housing 124. The stator assembly 128 surrounds the interior rotor 130. The difference between the interior diameter of the stator assembly 128 and the outer diameter of the rotor 130 defines a stator-rotor gap 132 that extends along the length of the rotor 130.

Figure 3:
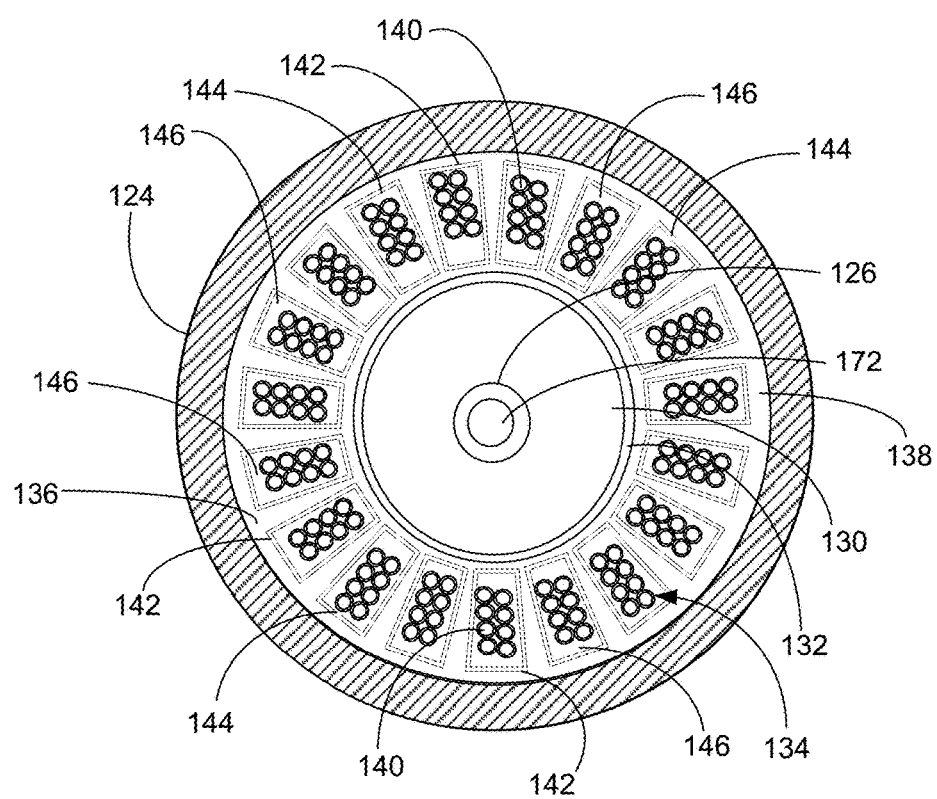
FIG. 3 is a top cross-sectional view of the motor of FIG. 2.

As also depicted in the cross-sectional view of the motor in FIG. 3, the stator assembly 128 includes stator coils 134 extending through a stator core 136. The stator core 136 is formed by stacking and pressing a number of thin laminates 138 to create an effectively solid core. The stator coils 134 are formed by extending magnet wire 140 through slots 142 in each laminate 138 of the stator core 136. The magnet wire 140 is insulated from the laminates 138 by slot liners 144. The slot liners are manufactured from a durable, electrically isolating material, such as perfluoroalkoxy (PFA) polymer. The cross-sectional area of the interior of each of the slot liners 144 is greater than the combined cross-sectional area of the multiple passes of magnet wire 140 within each slot liner 144. The difference between the cross-sectional area of the slot liner 144 and the aggregate cross-sectional area of the magnet wire 140 defines a stator slot oil passage 146 that is filled with dielectric motor lubricating oil.

Figure 4:
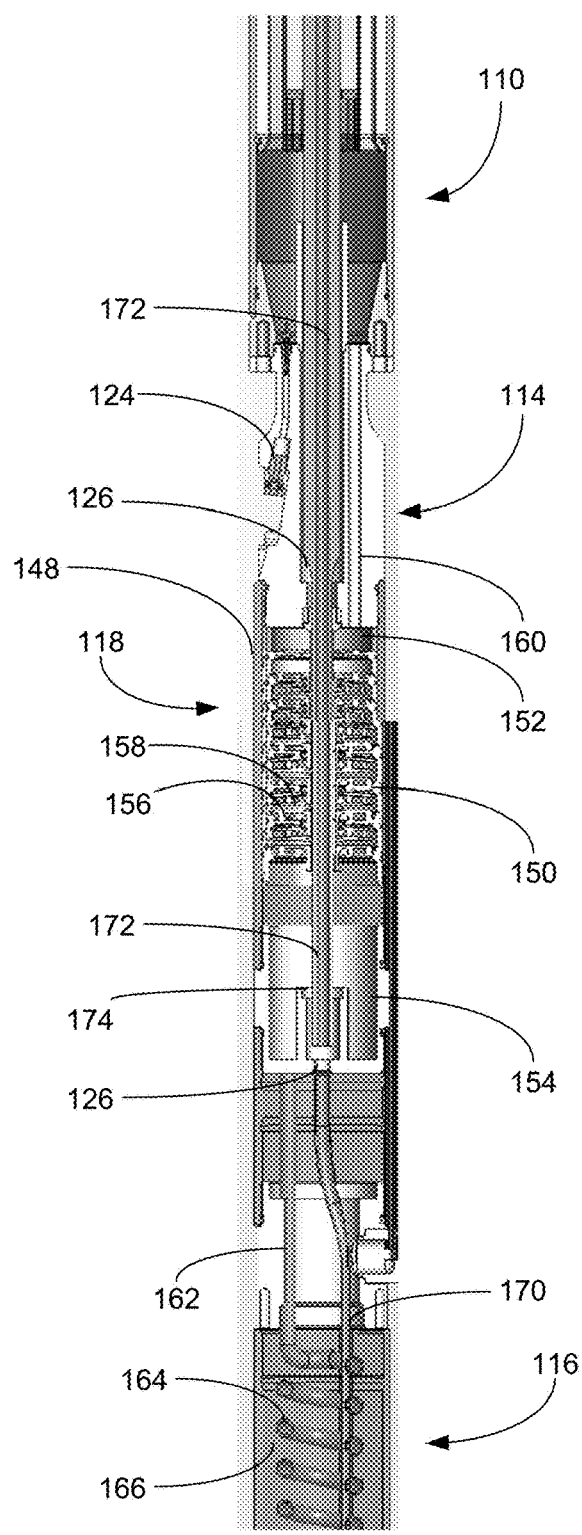
FIG. 4 is a cross-sectional view of the pumping system of FIG. 1 showing a portion of the motor, the coupler, the oil circulation pump and a portion of the heat exchanger.

Turning to FIG. 4, shown therein is a cross-sectional depiction of an embodiment of the oil circulation pump 118, coupler 114 and a portion of the motor 110 and the heat exchanger 116. The oil circulation pump 118 includes a circulation pump housing 148 that is connected to the coupler 114 and to the heat exchanger 116. The oil circulation pump 118 includes one or more pump stages 150, a pump intake 152 and a pump discharge 154. Each of the one or more pump stages 150 is a turbomachine that includes a stationary diffuser 156 and a rotatable impeller 158 that is connected to the motor shaft 126. When rotated by the motor 110, the pump impellers 158 push the motor lubricant through the oil circulation pump 118. In alternative embodiments, the oil circulation pump 118 includes rotary or reciprocating positive displacement pump stages.

The coupler 114 includes a lubricant passage 160 that connects the lower end of the motor 110 to the pump intake 152. The lubricant passage 160 transfers motor lubricant from the bottom of the motor 110 through the coupler 114 to the oil circulation pump 118. The oil circulation pump 118 pushes the motor lubricant from the coupler 114 out of the discharge 154 and into the heat exchanger 116.

The heat exchanger 116 includes an inlet 162 that is in fluid communication with the discharge 154 of the oil circulation pump 118. The inlet 162 carries pressurized motor lubricant into the heat exchanger 116. In an embodiment, the heat exchanger 116 includes a series of tubing coils 164 disposed within a coolant shell 166. The coolant shell 166 may be in fluid communication with the wellbore 104 through vents 168 (shown in FIG. 1) and the wellbore fluids can actively or passively circulate through the coolant shell 166. Alternatively, or the shell 166 may include a cooling fluid that is isolated from the wellbore 104. It will be appreciated that other embodiments include the use of alternative forms and configurations of heat exchangers 116.

Motor lubricant is carried out of the heat exchanger 116 through an outlet 170. The outlet 170 terminates adjacent the shaft 126. The shaft 126 includes a central passage 172 that extends through the center of the shaft 126. A shaft seal 174 within the discharge 154 of the oil circulation pump 118 prevents higher pressure fluid in the discharge 154 from entering the outlet 170 or central passage 172. The central passage 172 extends through the shaft 126 into an upper region of the motor 110 (shown in FIG. 2). The shaft 126 may include discharge ports 176 that expel motor lubricant from the central passage 172 into the upper region of the motor 110 (as shown in FIG. 2).

In some embodiments, hot motor lubricant is drawn downward out of the motor 110 through the lubricant passage 160 into the oil circulation pump 118. The motor lubricant is pressurized in the oil circulation pump 118 and discharged into the inlet 162 of the heat exchanger 116. The pressurized motor lubricant passes through the heat exchanger 116, where it transfers heat to fluid in the coolant shell 166. The cooled motor lubricant is then returned to the top of the motor 110 through the outlet 170 of the heat exchanger 116, central passage 172 of the shaft 126, and discharge ports 176 of the shaft 126.

In this way, the pumping system 100 includes an internal oil circulation system 178 which includes some or all of the following components: the stator slot oil passages 146 and the stator-rotor gap 132 in the motor 110, the lubricant passage 160 in the coupler 114, the pump stages 150 of the oil circulation pump, the inlet 162, tubing coils 164 and outlet 166 of the heat exchanger 116, and the central passage 172 of the shaft 126. The internal oil circulation system 178 thus provides a mechanism for circulating motor lubricant between the motor 110 and the heat exchanger 116 without the use of external conduits or conduits that are exposed directly to the wellbore 104.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A pumping system deployable in a wellbore, the pumping system comprising:
    a motor, wherein the motor is filled with a motor lubricant oil, wherein the motor comprises:
        a rotor;
        a stator assembly, wherein the stator assembly comprises:
            a stator core; and
            stator coils extending through the stator core; and
        a stator-rotor gap between the rotor and the stator assembly;
    a production pump driven by the motor;
    a heat exchanger; and
    an internal oil circulation system contained within the pumping system, wherein the internal oil circulation system circulates the motor lubricant oil between the motor and the heat exchanger.

2. The pumping system of claim 1, further comprising an oil circulation pump driven by the motor.

3. The pumping system of claim 2, wherein the oil circulation pump comprises:
    a pump intake;
    one or more pump stages; and
    a pump discharge.

4. The pumping system of claim 1, further comprising a shaft extending from the motor to the oil circulation pump, wherein the shaft comprises a central passage.

5. The pumping system of claim 4, wherein the heat exchanger comprises an outlet in fluid communication with the central passage of the shaft.

6. The pumping system of claim 1 further comprising a coupler connected between the motor and the oil circulation pump, wherein the coupler comprises a lubricant passage that carries motor lubricant from the motor to the oil circulation pump.

7. The pumping system of claim 6, wherein the coupler further comprises a sensor socket.

8. The pumping system of claim 1, wherein the heat exchanger comprises:
    tubing coils; and
    a coolant shell.

9. The pumping system of claim 1, wherein the stator core comprises a plurality of stator laminates and wherein each of the stator laminates comprises:
    a plurality of stator slots;
    a slot liner in each of the plurality of stator slots;
    magnet wire extending through each of the slot liners; and
    a stator slot oil passage extending through each of the slot liners.

10. A pumping system configured for deployment within a wellbore, the pumping system comprising:
    an electric motor, wherein the motor is filled with motor lubricant oil,
        wherein the motor comprises:
            a rotor;
            a stator assembly, wherein the stator assembly comprises:
                a stator core; and
                stator coils extending through the stator core; and
            a stator-rotor gap between the rotor and the stator assembly;
    a heat exchanger; and
    an internal oil circulation system connected between the electric motor and the heat exchanger and configured to circulate motor oil between the motor and the heat exchanger, wherein the internal oil circulation system is not directly exposed to the wellbore.

11. The pumping system of claim 10 further comprising an oil circulation pump connected between the electric motor and the heat exchanger.

12. The pumping system of claim 11 further comprising a rotatable shaft extending from the motor to the oil circulation pump, wherein the rotatable shaft carries torque from the motor to the oil circulation pump.

13. The pumping system of claim 12, wherein the rotatable shaft comprises a central passage that carries motor lubricant from the heat exchanger to the electric motor.

14. A method for controlling the operational temperature of an electric motor in a submersible pumping system disposed in a well, wherein the pumping system includes a production pump driven by the electric motor to produce fluids from the wellbore, the method comprising the steps of:
providing an oil circulation pump driven by the electric motor;
providing a heat exchanger;
activating the oil circulation pump to draw motor lubricant at an elevated temperature from the electric motor by moving the motor lubricant through a stator-rotor gap between a stator assembly and rotor within the electric motor, wherein the motor lubricant at an elevated temperature has absorbed heat from the operating electric motor;
moving the warmed motor lubricant from the electric motor to the heat exchanger through an internal oil circulation system;
passing the motor lubricant through the heat exchanger to reduce the temperature of the motor lubricant to a second temperature;
moving the cooled motor lubricant from the heat exchanger back to the operating motor through the internal oil circulation system; and
expelling the cooled motor lubricant from the internal oil circulation system to the motor.

15. The method of claim 14, wherein the step of activating the oil circulation pump comprises:
energizing the electric motor; and
transferring torque from the electric motor to the oil circulation pump through a motor shaft.

16. The method of claim 15, wherein the step of activating the production pump comprises:
energizing the electric motor; and
transferring torque from the electric motor to the production pump through a series of shafts.

17. The method of claim 14, wherein the step of activating the oil circulation pump to move motor lubricant at an initial temperature through the electric motor further comprises moving the motor lubricant through stator slot oil passages within stator slots within the electric motor.

18. The method of claim 14, wherein the step of moving the cooled motor lubricant from the heat exchanger back to the operating motor through the internal oil circulation system comprises passing the cooled motor lubricant through a central passage within the shaft extending from the motor to the oil circulation pump.

* * * * *